United States Patent
Ma et al.

(10) Patent No.: US 11,672,381 B2
(45) Date of Patent: Jun. 13, 2023

(54) DRINKING CONTAINER WITH DIFFERENT TEMPERATURE ZONES

(71) Applicant: THE CURATORS OF THE UNIVERSITY OF MISSOURI, Columbia, MO (US)

(72) Inventors: Hongbin Ma, Columbia, MO (US); Michael Merwin, Columbia, MO (US); Hao Bai, Columbia, MO (US); Robert Riegler, Pacific, MO (US); Christopher Vincent, Columbia, MO (US); Susan Liu, Columbia, MO (US)

(73) Assignee: THE CURATORS OF THE UNIVERSITY OF MISSOURI, Columbia, MO (US)

( * ) Notice: Subject to any disclaimer, the term of this patent is extended or adjusted under 35 U.S.C. 154(b) by 820 days.

(21) Appl. No.: 16/494,817

(22) PCT Filed: Sep. 20, 2018

(86) PCT No.: PCT/US2018/051855
§ 371 (c)(1),
(2) Date: Sep. 17, 2019

(87) PCT Pub. No.: WO2019/060483
PCT Pub. Date: Mar. 28, 2019

(65) Prior Publication Data
US 2020/0008623 A1 Jan. 9, 2020

Related U.S. Application Data

(60) Provisional application No. 62/561,620, filed on Sep. 21, 2017.

(51) Int. Cl.
*A47J 41/00* (2006.01)
*A47G 19/16* (2006.01)
(Continued)

(52) U.S. Cl.
CPC .......... *A47J 41/0044* (2013.01); *A47G 19/16* (2013.01); *A47G 19/2272* (2013.01);
(Continued)

(58) Field of Classification Search
CPC ...... F28D 9/0012; F25D 3/08; F25D 2303/08; F25D 2303/08222; F25D 2303/0842; A47G 19/127; A47G 19/16
See application file for complete search history.

(56) References Cited

U.S. PATENT DOCUMENTS

| 2,876,634 A | 3/1959 | Zimmerman et al. |
| 3,205,677 A | 9/1965 | Stoner |

(Continued)

FOREIGN PATENT DOCUMENTS

GB 2447234 B 2/2009

OTHER PUBLICATIONS

International Search Report for corresponding PCT/US2018/051855 dated Nov. 21, 2018.

*Primary Examiner* — Andrew T Kirsch
(74) *Attorney, Agent, or Firm* — Sandberg Phoenix & von Gontard PC (57) ABSTRACT

A drinking container system with multiple temperature zones, wherein the container system includes a main body having a sidewall and a bottom that define a phase change material (PCM) module receptacle, and a phase change material (PCM) module having a sidewall that defines a beverage chamber. The PCM module is disposable within the PCM module receptacle such that a beverage egress flow path is defined between the main body sidewall and the PCM module sidewall. The flow path formed in the container can make the beverage achieve the desired drinking temperature. The PCM module sidewall is at least partially filled with a phase change material and is structured and operable to provide a plurality temperature zones within the beverage chamber. Each temperature zone is operable to maintain a temperature of a respective portion of a liquid disposed within the beverage chamber within a respective temperature range.

20 Claims, 2 Drawing Sheets

(51) Int. Cl.
*A47G 19/22* (2006.01)
*F25D 3/06* (2006.01)
*A47J 31/02* (2006.01)
*F25D 31/00* (2006.01)

(52) U.S. Cl.
CPC .......... *A47G 19/2288* (2013.01); *A47J 31/02* (2013.01); *F25D 3/06* (2013.01); *F25D 31/002* (2013.01); *F25D 31/005* (2013.01)

(56) References Cited

U.S. PATENT DOCUMENTS

| | | |
|---|---|---|
| 3,606,106 A | 9/1971 | Ryan et al. |
| 3,807,194 A | 4/1974 | Bond |
| 3,995,445 A | 12/1976 | Huskins |
| 4,638,645 A | 1/1987 | Simila |
| 6,634,417 B1 | 10/2003 | Kolowich |
| 7,934,537 B2 | 5/2011 | Kolowich |
| 2006/0156756 A1 | 7/2006 | Becke |
| 2009/0283533 A1 | 11/2009 | Hemminger et al. |
| 2012/0312521 A1* | 12/2012 | Zebuhr .................. F28D 9/04 165/104.11 |
| 2013/0221013 A1 | 8/2013 | Kolowich et al. |
| 2016/0045047 A1 | 2/2016 | Healy |

\* cited by examiner

DRINKING CONTAINER WITH DIFFERENT TEMPERATURE ZONES

CROSS-REFERENCE TO RELATED APPLICATIONS

This application is the US national stage under 35 U.S.C. § 371 of International Application No. PCT/US2018/051855, filed on Sep. 20, 2018, which claims the benefit of U.S. Provisional Application No. 62/561,620, filed on Sep. 21, 2017. The disclosure of the above applications are incorporated herein by reference in their entirety.

FIELD

The present teachings relate to thermally insulating containers, and more particularly to a heat exchanging thermal liquid container system.

BACKGROUND

The statements in this section merely provide background information related to the present disclosure and cannot constitute prior art.

There are many thermal insulating beverage containers on the market today. Such containers are typically structured and operable to minimize (i.e., slow down) the rejection and/or absorption of heat from the liquid beverage disposed within the container into or from the ambient environment. That is, such containers are structured and operable to slow down the cooling and/or warming of the liquid beverage by providing an insulating barrier between the hot or cold liquid and the ambient environment such that the rejection of the thermal energy within liquid to the ambient environment, and/or the absorption of the thermal energy within liquid by the ambient environment is minimized. Such thermal insulating beverage containers are relatively thermally inefficient and do not maintain the liquid beverage at a desirable drinking temperature for an extended period of time. For hot beverages an example of the desired drinking temperature can be approximately 98° F. to 160° F. (approximately 37° C. to 71° C.). For cold beverages an example of the desired drinking temperature can be approximately 32° F. to 50° F. (approximately 0° C. to 10° C.).

Such known thermal insulating beverage containers are generally known to maintain the respective liquid beverage within the desired drinking temperature range only for a short period of time (e.g., approximately 15 to 30 minutes. For example, if a hot beverage is poured into a paper cup without any insulation, the temperature of the beverage may remain within the desired drinking temperature range for only approximately 5-30 minutes. Or, for example, if a hot liquid is poured into a known insulated beverage container, e.g., a double-walled vacuum tumbler, the beverage may remain too hot that it cannot be consumed for a long period, for example, up to 4 hours.

Various related technology patents are U.S. Pat. Nos. 2,876,634; 3,205,677; 3,603,106; 3,807,194; 3,995,445; 4,638,645; 6,634,417; 7,934,537; and US0083755. However, the manufacturing process disclosed in such patents has limited application.

SUMMARY

In order to overcome at least some of the disadvantages described above, the present disclosure provides a drinking container system with at least two temperature zones.

For example, in various embodiments, the present disclosure provides a phase change container system that can quickly bring a beverage to an ideal drinking temperature and maintain the beverage at the ideal drinking temperature for many hours. Particularly, as hot fluid or beverage is poured into this container system, the container system can cause the beverage establish and maintain at least two temperature zones within the beverage, e.g., a low temperature zone (LTZ) for maintaining a first or LTZ portion of the beverage at a relatively lower temperature, and a high temperature zone (HTZ) for maintaining a second or LTZ portion of the beverage (e.g, the remainder of the beverage) at higher temperature relative to the temperature of the beverage within the LTZ. The HTZ is used to store beverages or fluids such as hot coffee or tea for better taste (flavor). The LTZ can adjust the temperature of the LTZ beverage portion to a temperature that is suitable for drinking. Therefore, when a beverage (e.g., coffee or tea) that is hotter than for drinking (e.g., above 160° F. or 71° C.) is poured in container system, the temperature of the LTZ portion of the beverage will be quickly adjusted to a suitable or desired drinking temperature (e.g., 36° F. to 160° F., 2° C. to 71° C.).

In various instances, the two temperature zones for beverages can be suitable for converting tea from boiling hot to warm, or room temperature beer to cold instantly when consumed. Particularly, when tea leaves or bags are disposed in HTZ portion of the beverage having at a higher temperature suitable for steeping tea (e.g., between 170° F. and 200° F., 77° C. and 95° C.), the tea can steep to provide a desired taste. However, the temperature required to steep tea is typically higher than desired for drinking and a person generally has to wait until the temperature of the beverage cools to a desired drinking temperature range (e.g., 98° F. to 160° F., 37° C. to 71° C.). With the container system of the present disclosure, when tea leaves are retained within the HTZ for steeping the tea, the LTZ can cool the resulting tea to a desired drinking temperature. Importantly, when one consumes the beverage, the beverage can have its respective temperature changed to a desired drinking temperature. Hence, in such instances, the drinking container system disclosed herein can steep tea and provide drinking temperature tea approximately simultaneously.

For example, in various embodiments, the present disclosure provides a drinking container system with multiple temperature zones, wherein the container system includes a main body having a sidewall and a bottom that define a phase change material (PCM) module receptacle, and a phase change material (PCM) module having a sidewall that defines a beverage chamber. The PCM module is disposable within the PCM module receptacle such that a beverage egress flow path is defined between the main body sidewall and the PCM module sidewall. The PCM module sidewall is at least partially filled with a phase change material and is structured and operable to provide a plurality temperature zones within the beverage chamber. Each temperature zone is operable to maintain a temperature of a respective portion of a liquid disposed within the beverage chamber within a respective temperature range.

For example, in various other embodiments, the present disclosure provides a drinking container system, wherein the system comprises a main body having a sidewall and a bottom that define a phase change material (PCM) module receptacle, and a phase change material (PCM) module having a sidewall that defines a beverage chamber. The PCM module is disposable within the PCM module receptacle such that a beverage egress flow path is defined between the main body sidewall and the PCM module sidewall. The PCM module sidewall is at least partially filled with a phase change material and is structured and operable to provide a low temperature zone (LTZ) within the beverage chamber that is operable to maintain a temperature of a portion of a liquid disposed within the LTZ within a first temperature range. The PCM module sidewall is further structured and operable to provide a high temperature zone (HTZ) within the beverage chamber that is operable to maintain a temperature of the portion of the liquid disposed within the HTZ within a second temperature range that is higher than the first temperature range.

For example, in yet other embodiments, the present disclosure provides a drinking container system, wherein the system comprises a main body having a sidewall and a bottom that define a phase change material (PCM) module receptacle, and a phase change material (PCM) module having a sidewall that defines a beverage chamber. The PCM module is disposable within the PCM module receptacle such that a beverage egress flow path is defined between the main body sidewall and the PCM module sidewall. The PCM module sidewall is at least partially filled with a phase change material and comprises a bottom portion that defines a low temperature zone (LTZ) within the beverage chamber that is operable to maintain a temperature of a portion of a liquid disposed within the LTZ within a first temperature range, wherein the bottom portion has a first thickness. The PCM module sidewall additionally comprises a top portion that defines high temperature zone (HTZ) within the beverage chamber that is operable to maintain a temperature of a portion of the liquid disposed within the HTZ within a second temperature range that is higher than the first temperature range. The top portion, and the respective PCM therein, has a second thickness that is less than the first thickness of bottom portion, and the respective PCM therein.

This summary is provided merely for purposes of summarizing various example embodiments of the present disclosure so as to provide a basic understanding of various aspects of the teachings herein. Various embodiments, aspects, and advantages will become apparent from the following detailed description taken in conjunction with the accompanying drawings which illustrate, by way of example, the principles of the described embodiments. Accordingly, it should be understood that the description and specific examples set forth herein are intended for purposes of illustration only and are not intended to limit the scope of the present teachings.

DRAWINGS

The drawings described herein are for illustration purposes only and are not intended to limit the scope of the present teachings in any way.

Corresponding reference numerals indicate corresponding parts throughout the several views of drawings.

DETAILED DESCRIPTION

The following description is merely exemplary in nature and is in no way intended to limit the present teachings, application, or uses. Throughout this specification, like reference numerals will be used to refer to like elements. Additionally, the embodiments disclosed below are not intended to be exhaustive or to limit the invention to the precise forms disclosed in the following detailed description. Rather, the embodiments are chosen and described so that others skilled in the art can utilize their teachings. As well, it should be understood that the drawings are intended to illustrate and plainly disclose presently envisioned embodiments to one of skill in the art, but are not intended to be manufacturing level drawings or renditions of final products and can include simplified conceptual views to facilitate understanding or explanation. As well, the relative size and arrangement of the components can differ from that shown and still operate within the spirit of the invention.

As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims.

Unless otherwise defined, all technical and scientific terms used herein have the same meaning as commonly understood by one of ordinary skill in the art to which this disclosure belongs. The terminology used herein is for the purpose of describing particular example embodiments only and is not intended to be limiting. As used herein, the singular forms "a," "an," and "the" can be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps can be employed.

When an element, object, device, apparatus, component, region or section, etc., is referred to as being "on," "engaged to or with," "connected to or with," or "coupled to or with" another element, object, device, apparatus, component, region or section, etc., it can be directly on, engaged, connected or coupled to or with the other element, object, device, apparatus, component, region or section, etc., or intervening elements, objects, devices, apparatuses, components, regions or sections, etc., can be present. In contrast, when an element, object, device, apparatus, component, region or section, etc., is referred to as being "directly on," "directly engaged to," "directly connected to," or "directly coupled to" another element, object, device, apparatus, component, region or section, etc., there can be no intervening elements, objects, devices, apparatuses, components, regions or sections, etc., present. Other words used to describe the relationship between elements, objects, devices, apparatuses, components, regions or sections, etc., should be interpreted in a like fashion (e.g., "between" versus "directly between," "adjacent" versus "directly adjacent," etc.).

As used herein, the term "and/or" includes any and all combinations of one or more of the associated listed items. For example, A and/or B includes A alone, or B alone, or both A and B.

Although the terms first, second, third, etc. can be used herein to describe various elements, objects, devices, apparatuses, components, regions or sections, etc., these elements, objects, devices, apparatuses, components, regions or sections, etc., should not be limited by these terms. These terms can be used only to distinguish one element, object, device, apparatus, component, region or section, etc., from another element, object, device, apparatus, component, region or section, etc., and do not necessarily imply a sequence or order unless clearly indicated by the context.

Moreover, it will be understood that various directions such as "upper", "lower", "bottom", "top", "left", "right", "first", "second" and so forth are made only with respect to explanation in conjunction with the drawings, and that components can be oriented differently, for instance, during transportation and manufacturing as well as operation. Because many varying and different embodiments can be made within the scope of the concept(s) herein taught, and because many modifications can be made in the embodiments described herein, it is to be understood that the details herein are to be interpreted as illustrative and non-limiting.

Figure 1:
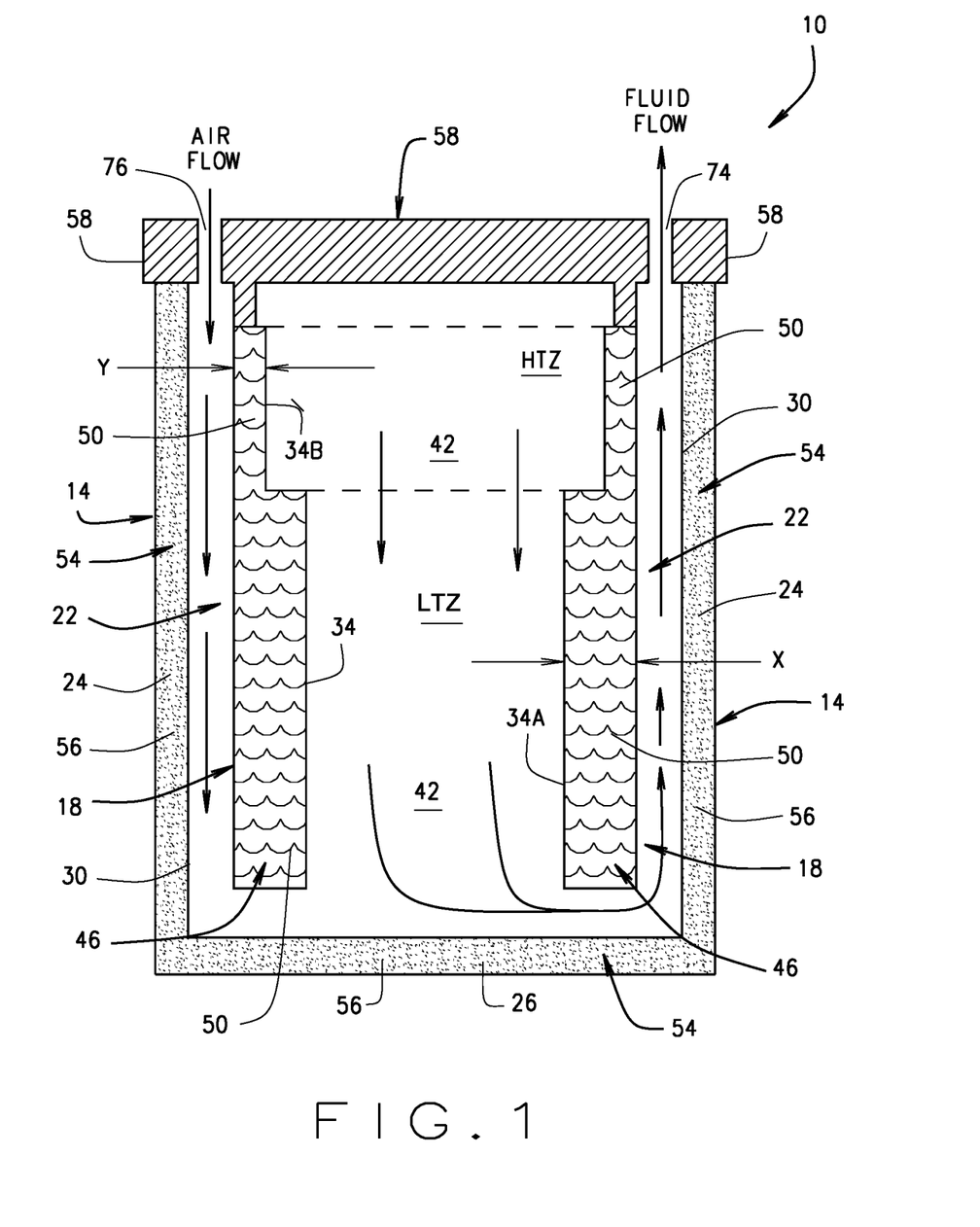
FIG. 1 is a schematic sectional view of a multiple temperature zone drinking container system, in accordance with the present disclosure.

Referring to FIG. 1, in various embodiments the present disclosure provides a multiple temperature zone drinking container system 10 that is structured and operable to have a plurality of contiguous temperature zones. Particularly, the container system 10 is structured to have a plurality of contiguous temperature zones wherein each temperature zone is operable to establish a temperature of a portion of a beverage disposed within the container system 10 within a particular temperature range that is specific to the respective temperature zone and is different than the temperature range of the other temperature zone(s). Although the container system 10 will be described herein to comprise two adjacent contiguous temperature zones, it should be understood that the container system 10 of the present disclosure can comprise multiple adjacent and contiguous temperature zones (e.g., more than two temperature zones) and remain within the scope of the present disclosure.

In various embodiments, the container system 10 comprises a main body 14 and a removable phase change material (PCM) chamber 18 disposable within the main body 14 such that an air and beverage (or fluid) ingress/egress flow path 22 is defined there between. The main body 14 is structured and formed to have at least one sidewall 24 and a bottom 26 that define a PCM module receptacle 30, and the PCM module 18 is structured to fit within and be disposed within the PCM module receptacle 30 such that the air/beverage ingress/egress flow path 22 is defined there between. The PCM module 18 is generally a hollow open ended tubular body having at least one hollow sidewall 34 that defines a multiple temperature zone (as exemplarily illustrated, a two temperature zone) liquid or beverage chamber 42 within an interior of the PCM module 18 that is suitable for having various hot and/or cold liquids and beverages (e.g., coffee, tea, hot chocolate, soda, beer, water, etc.) disposed therein. The main body 14 and the PCM module 18 sidewall(s) 24 and 34 can be structured and formed to have generally any radial (or lateral) cross-sectional shape and to define the beverage reservoir 42 having generally any lateral cross-sectional shape. For example, in various embodiments, the main body 14 and the PCM module 18 sidewall(s) 24 and 34 can be structured and formed to have a cylindrical, square, oval, rectangular, triangular, etc., radial (or lateral) cross-sectional shape, and the beverage chamber 42 can have any similar or dissimilar cylindrical, square, oval, rectangular, triangular, etc., radial (or lateral) cross-sectional shape. In various instances the PCM module 18 can be a removable module removably disposed within the PCM module receptacle 30, or alternatively the PCM module 18 can be fixedly connected to the main body 14.

In various embodiments, the width of the air/beverage ingress/egress flow path 22, i.e., the width of the gap or space between the main body 14 and the detachable PCM module 18 can be determined using advanced heat transfer modeling verified by experimental data to ensure that the temperature of the beverage flowing from the beverage chamber 42, through the ingress/egress flow path 22 and dispensed through a drinking hole 74 in a lid assembly 58, described below, is at a desired drinking temperature.

As described above, the PCM module 18 is a hollow open ended tubular body. More particularly, the PCM module 18 is structured and formed to include an interior hollow space that defines a closed PCM cavity 46 that can be at least partially filled with any desired phase change material (PCM) 50. It is envisioned that the PCM module 18 can be any one or more reservoir, bladder, compartment, cavity, container, housing, or other hollow walled structure wherein the hollow wall 34 can be at least partially filled with the PCM 50. The sidewall 34 is structured and formed to be airtight and leak-tight such that any beverage (or other liquid) that may be disposed within beverage chamber 42 will not leak, migrate or otherwise enter the PCM cavity 46, and similarly such that the PCM 50 will not leak, migrate or otherwise enter the beverage chamber 42. The PCM chamber 18 can be fabricated of any material suitable for retaining hot and/or cold beverages (or liquids), e.g., beverages (or liquids) ranging from approximately 20° F. to 200° F., approximately −7° C. to 94° C. For example, it is envisioned that the PCM liner 18 can be fabricated from stainless steel, glass, ceramics, suitable plastics, etc.

In various embodiments, the main body 14 can be a hollow body structured and formed to include an interior hollow space that defines an insulation cavity 54 that can be at least partially filled with insulation 56. The insulation 56 can be any suitable insulation. For example, in various embodiments the insulation cavity 54 can be at least partially filled with any desired insulating material, gas or liquid, or can be absent a material, gas or liquid. For example, in various instances, the insulation cavity 54 can be absent or void of air, or mostly absent or void of air (e.g., a vacuum or reduced air), or in other instances the insulation cavity 54 can be at least partially filled with fiberglass, polystyrene, polyurethane foam, cellulose, mineral wool, or any other presently and future known insulation material. In such embodiments, the insulating function provided by the insulation 56 within insulation cavity 54 of the main body 14 will reduce and retard the rejection of thermal energy (e.g., heat loss) from the PCM 50 and beverage disposed within the beverage chamber 42 and ingress/egress flow path 22 to the ambient environment such that the PCM 50 will remain at approximately its respective phase change temperature (also referred to herein as the melting temperature), and the beverage within the flow path 22 will remain at the desired drinking temperature for an extended period of time.

In various embodiments the sidewall 34 of the PCM module sidewall 34 is structured to have a plurality of different width/thicknesses, or to have varying width/thicknesses, or to have a substantially linearly decreasing width/thickness from the bottom to the top of the PCM module 18.

For example, in various instances, the sidewall 34 is structured to have a bottom portion 34A and a top portion 34B, wherein the bottom portion 34A has a first width/thickness X that is thicker than the top portion 34B having a second width/thickness Y. As one skilled in the art will readily recognize, the volume per $mm^3$ of the PCM 50 disposed within the thinner/narrower top portion 34B will be less than the volume per $mm^3$ of the PCM 50 disposed within the thicker/wider bottom portion 34A. Accordingly, as one skilled in the art will further readily recognize, due to the difference in volume of the PCM 50, when a beverage is disposed within the beverage chamber 42, the portion of the beverage disposed within the top portion of the chamber 42 adjacent the thinner/narrower top portion 34B of the sidewall 34 will have less heat (or thermal energy) removed/absorbed by the PCM 50 within the sidewall top portion 34B, than the portion of the beverage disposed within the bottom portion of the chamber 42 adjacent the thicker/wider bottom portion 34A of the sidewall 34 will have removed/absorbed by the PCM 50 within the sidewall bottom portion 34A. As used herein, the volume of the beverage chamber 42 defined by the sidewall thinner/narrower top portion 34B will be referred as the High Temperature Zone (HTZ) of the beverage chamber 42, and the volume of the beverage chamber 42 defined by the sidewall thicker/wider bottom portion 34A will be referred as the Low Temperature Zone (LTZ) of the beverage chamber 42.

Therefore, the PCM module 18 will adjust and maintain the temperature of a beverage disposed within the beverage chamber 42 to have a bottom portion (e.g., the portion of the beverage within the LTZ) having a temperature within a first temperature range (e.g., between approximately 36° F. and 98° F., 2° C. to 37° C.), and a top portion (e.g., the portion of the beverage within the HTZ) having a temperature within a second temperature range that is higher than the first temperature range (e.g., between approximately 98° F. and 160° F., 37° C. and 71° C.). As described above, in various embodiments it is envisioned that the PCM module 18 can be structured and operable to have more than two temperature zones.

More specifically, in operation, when a beverage, e.g., a hot beverage such as coffee, is poured into or disposed within the beverage chamber 42, the thermal energy (i.e., the heat) from the portion of the hot beverage disposed within the HTZ will be transferred to (i.e., rejected to and absorbed by) the PCM 50 within the thinner/narrower sidewall top portion 34B, causing the respective PCM 50 to change phase from a substantially solid form to a liquid form, whereby the PCM 50 stores the thermal energy (i.e., the heat). Substantially simultaneously, the thermal energy (i.e., the heat) from the portion of the hot beverage disposed within the LTZ is transferred to (i.e., rejected to and absorbed by) the PCM 50 within the thicker/wider sidewall bottom portion 34A, causing the respective PCM 50 to change phase from a substantially solid form to a liquid form, whereby the PCM 50 stores the thermal energy (i.e., the heat). However, since the volume per mm3 of the PCM 50 within the thicker/sider sidewall bottom portion 34A is greater than that of the PCM within the thinner/narrower sidewall top portion 34B, a greater amount of thermal energy will be removed from the portion of the beverage disposed within the LTZ. Hence, the portion of the beverage disposed within the HTZ will be retained at a higher temperature than the portion of the beverage disposed within the LTZ.

Importantly, when a hot beverage is just disposed within the beverage chamber 42, the hot beverage can be consumed instantly. As soon as the hot beverage is disposed within the beverage chamber 42, one can drink the beverage instantly because as the system 10 is tilted by a user to consume the hot beverage therein, the hot beverage will flow from the LTZ, through the air/beverage ingress/egress flow path 22 and out the drinking hole 74. As the hot beverage flows from the LTZ and through the air/beverage ingress/egress flow path 22 the PCM disposed within the PCM cavity 46 will absorb heat from the hot beverage and reduce the temperature of the beverage to the desired drinking temperature so that as the beverage exits through the drinking hole 74 the beverage is at the desired drinking temperature.

Generally, a PCM is a substance with a high heat of fusion which, melting and solidifying at a certain temperature, is capable of storing and releasing large amounts of energy. Heat is absorbed or released when the material changes from solid to liquid and vice versa, thus, PCMs are often classified as latent heat storage (LHS) units. When PCMs reach the temperature at which they change phase (their melting temperature) they absorb large amounts of heat at an almost constant temperature. The PCM continues to absorb heat without a significant rise in temperature until all the material is transformed to the liquid phase. When the ambient temperature around a liquid material falls, the PCM solidifies, releasing its stored latent heat. A large number of PCMs are available in any required temperature range, e.g., from approximately 20° F. to 375° F. (approximately from −7° C. up to 19° C.). Many PCMs can store 5 to 14 times more heat per unit volume than conventional storage materials such as water, masonry or rock.

Note the PCM 50 of the system 10 is selected to have melting temperature that is within a desired drinking temperature range for the respective beverage. Thereafter, when the temperature of the beverage changes, e.g., cools down, such that the temperature of the beverage within the respective HTZ and LTZ of the beverage chamber 42 is reduced to a temperature that is below the desired respective HTZ temperature range and LTZ temperature range, and hence, below the melting temperature of PCM 50, the PCM 50 releases (i.e., rejects) the thermal energy (i.e., the heat) stored in the PCM 50 back into beverage. That is, the heat stored in the PCM 50 is rejected to and absorbed by the beverage, thereby maintaining the portions of the beverage within the respective HTZ and LTZ within the desired HTZ and LTZ temperature ranges.

Because most PCM materials have a low thermal conductivity, in various embodiments it is envisioned that heat pipes and/or heat sinks can be disposed within the in the PCM module 18 to increase the heat transfer rate.

In various embodiments, the container system 10 can additionally include a lid or cap assembly 58 that is removably engageable with the main body 14 and/or the PCM chamber 18 to cover the top opening of the beverage chamber 42 and the air/beverage ingress/egress flow path 22. The lid assembly 58 is structured and operable to prevent and/or inhibit the beverage disposed within the beverage reservoir 42 and the ingress/egress flow path 22 from readily flowing or splashing out of the beverage chamber 42 and ingress/egress flow path 22, and to allow controlled dispensing of the beverage from the beverage chamber 42 via the air/beverage ingress/egress flow path. The lid assembly 58 includes a drinking hole 74 and an air hole 76 that each align with the air/beverage ingress/egress flow path 22 when the lid 58 is engaged with the main body 14 and/or the PCM chamber 18. The drinking hole is structured and operable to allow the beverage within the beverage chamber 42 to be controllably dispensed though the drinking hole 74 for consumption by a user. The air hole 76 is structured and operable to allow air to be drawn into beverage chamber 42 as the beverage is dispensed through the drinking hole 74. Particularly, as the system 10 is tilted to dispense the beverage, the portion of the beverage within the HTZ will flow into the LTZ, and the portion of the beverage within the LTZ will flow through the ingress/egress flow path 22 and be dispensed through the drinking hole 74. During this flow process, the temperature of a hot beverage can be reduced, and when it reaches the outlet of the drinking hole, it will have acquired a desired drinking temperature. Particularly, as described above, as the beverage flows from the HTZ to the LTZ the temperature of the beverage is adjusted (raised or lowered) a first increment, via the PCM 50 within the PCM cavity 46. Then, as the beverage flows from the LTZ through the ingress/egress flow path 22, the temperature of the beverage will be adjusted further (raised or lowered) to the desired drinking temperature, via the PCM 50 within the PCM cavity 46, so that as the beverage flows through the drinking hole 74 it will be at the desired drinking temperature. Substantially simultaneously, ambient air will be drawn into the ingress/egress flow path 22 as the beverage is dispensed, thereby providing a smooth flow of the beverage through the drinking hole 74. Additionally, as described above, the insulation cavity 54 of the main body 14 is structured and operable to significantly reduce heat loss such that the container system 10 can maintain a beverage at the desired drinking temperature for an extended period of time, e.g., approximately 1 to 15 hours.

It should be understood that although FIG. 1 exemplarily identifies a single hole in the lid 58 to be drinking hole 74 and a single hole in the lid 58 to be the air hole, because the ingress/egress flow path circumferentially surrounds or encompasses the PCM module 18, the drinking hole 74 and air hole 76 can be interchangeable and function as both the drinking hole 74 and the air hole 76 depending on which way the system 10 is tilted to dispense the beverage. Hence, the beverage can be dispensed out of either hole 74 or 76 and air will be drawn into the respective other hole 74 of 76.

Figure 2:
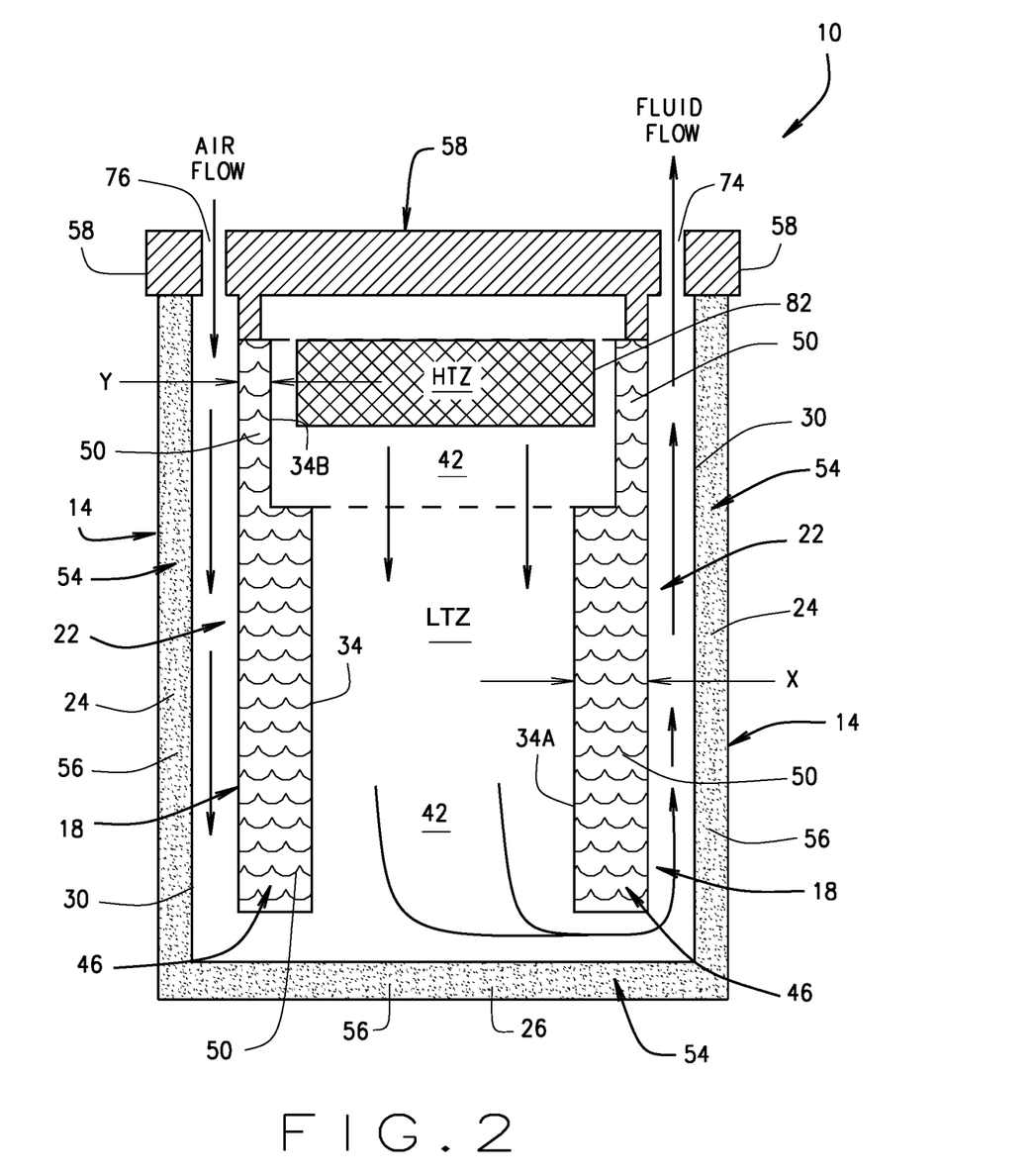
FIG. 2 is a schematic sectional view of the multiple temperature zone drinking container system shown in FIG. 1 comprising a tea steeping basket, in accordance with the present disclosure.

Referring now to FIG. 2, as described above, the HTZ of the beverage chamber 42 can be utilized to steep tea and the LTZ can be utilized to cool the resulting tea to a desired drinking temperature. For example, in various instances, the HTZ and LTZ can be utilized to steep tea and convert the resulting tea from boiling hot to warm or cold in brief period of time (e.g., 5-15 seconds). Particularly, when tea leaves or bags are disposed in HTZ portion of the beverage having at a temperature suitable for steeping tea (e.g., between 170° F. and 200° F., 77° C. and 95° C.), the tea can steep to provide a desired taste. However, the temperature required to steep tea is typically higher than desired for drinking e.g., between 98° F. and 160° F., 37° C. and 71° C. Utilizing the container system 10, when tea leaves are retained within the HTZ for steeping the tea, the LTZ can cool the resulting tea and the passage of the tea through ingress/egress flow path will dispense the tea through the drinking hole 74 within a desired drinking temperature range. In various embodiments, the container system 10 can include a tea basket 82 disposed within the HTZ portion of the PCM module 18. In such instances the tea basket 82 is structure and operable to retain one or more tea bag and/or tea leaves so that the tea bag(s) and/or tea leaves can be maintained within the HTZ to steep. It is envisioned that in various embodiments the tea basket 82 can be removably disposable within the HTZ portion of the PCM module 18. Or, in other embodiments, the tea basket 82 can be fixedly disposable within the HTZ portion of the PCM module 18.

The description herein is merely exemplary in nature and, thus, variations that do not depart from the gist of that which is described are intended to be within the scope of the teachings. Moreover, although the foregoing descriptions and the associated drawings describe example embodiments in the context of certain example combinations of elements and/or functions, it should be appreciated that different combinations of elements and/or functions can be provided by alternative embodiments without departing from the scope of the disclosure. Such variations and alternative combinations of elements and/or functions are not to be regarded as a departure from the spirit and scope of the teachings.

What is claimed is:

1. A drinking container system, said system comprising:
a main body having a sidewall and a bottom that define a phase change material (PCM) module receptacle; and
a phase change material (PCM) module having a sidewall, the PCM module disposable within the PCM module receptacle such that a beverage chamber is defined within an interior space of the PCM module defined by the PCM module sidewall and between a distal end of the PCM module sidewall and the bottom of the main body, and such that a beverage egress flow path is defined by the PCM module and main body bottom and sidewall that extends from the interior space of the PCM module, between the distal end of the PCM module sidewall and the bottom of the main body and between the PCM module sidewall and the main body sidewall, wherein the PCM module sidewall is at least partially filled with a phase change material and is structured and operable to provide a plurality temperature zones within the beverage chamber, wherein each temperature zone is operable to maintain a temperature of a respective portion of a liquid disposed within the beverage chamber within a respective temperature range.

2. The system of claim 1, wherein the PCM module is removeably disposable within the PCM module receptacle.

3. The system of claim 1, wherein the plurality of temperature zones provided by the PCM module sidewall comprise:
a low temperature zone (LTZ) structured and operable to maintain a temperature of the portion of the liquid disposed within the LTZ within a first temperature range; and
a high temperature zone (HTZ) structured and operable to maintain a temperature of the portion of the liquid disposed within the HTZ within a second temperature range that is higher than the first temperature range.

4. The system of claim 3 further comprising a tea basket removably disposable within the HTZ.

5. The system of claim 3, wherein a volume per $mm^3$ of the phase change material within a LTZ portion the PCM module sidewall that provides the LTZ is greater than a volume per $mm^3$ of the phase change material within a HTZ portion of the PCM module sidewall that provides the HTZ, such that LTZ portion of the PCM module sidewall will absorb more thermal energy from the portion of the liquid disposed within LTZ of the beverage chamber than the HTZ portion of PCM module sidewall will absorb from the portion of the liquid disposed within the HTZ of the beverage chamber.

6. The system of claim 3, wherein the PCM module sidewall comprises:
a bottom portion that defines the LTZ, the bottom portion having a first thickness; and a top portion that defines the HTZ, the top portion having a second thickness that is less than the first thickness of bottom portion.

7. The system of claim 6 further comprising a tea basket removably disposable within the HTZ.

8. The system of claim 6, wherein a volume per $mm^3$ of the phase change material within the bottom portion the PCM module sidewall is greater than a volume per $mm^3$ of the phase change material within the top portion of PCM module sidewall, such that bottom portion of the PCM module sidewall will absorb more thermal energy from the portion of the liquid disposed within LTZ of the beverage chamber than the top portion of PCM module sidewall will absorb from the portion of the liquid disposed within the HTZ of the beverage chamber.

9. The system of claim 1 further comprising a lid assembly that is removably engageable with at least one of the main body and the PCM module, the lid comprising a drinking hole that aligns with the egress flow path with the lid is engaged with the at least one of the main body and the PCM module.

10. The system of claim 1, wherein beverage egress flow path is structured and operable to alter the temperature of a beverage flowing therethrough to a desired drinking temperature, via the phase change material within PCM module sidewall, as the beverage flows through beverage egress flow path.

11. A drinking container system, said system comprising:
a main body having a sidewall and a bottom that define a phase change material (PCM) module receptacle; and
a phase change material (PCM) module having a sidewall, the PCM module disposable within the PCM module receptacle such that a beverage chamber is defined within an interior space of the PCM module defined by the PCM module sidewall and between a distal end of the PCM module sidewall and the bottom of the main body, and such that a beverage egress flow path is defined by the PCM module and main body bottom and sidewall that extends from the interior space of the PCM module, between the distal end of the PCM module sidewall and the bottom of the main body and between the PCM module sidewall and the main body sidewall, wherein the PCM module sidewall is at least partially filled with a phase change material and is structured and operable to provide:
a low temperature zone (LTZ) within the beverage chamber that is operable to maintain a temperature of a portion of a liquid disposed within the LTZ within a first temperature range; and
a high temperature zone (HTZ) within the beverage chamber that is operable to maintain a temperature of the portion of the liquid disposed within the HTZ within a second temperature range that is higher than the first temperature range.

12. The system of claim 11, wherein the PCM module is removeably disposable within the PCM module receptacle.

13. The system of claim 11, wherein a volume per $mm^3$ of the phase change material within a LTZ portion the PCM module sidewall that provides the LTZ is greater than a volume per $mm^3$ of the phase change material within a HTZ portion of the PCM module sidewall that provides the HTZ, such that LTZ portion of the PCM module sidewall will absorb more thermal energy from the portion of the liquid disposed within LTZ of the beverage chamber than the HTZ portion of PCM module sidewall will absorb from the portion of the liquid disposed within the HTZ of the beverage chamber.

14. The system of claim 11, wherein the PCM module sidewall comprises:
a bottom portion that defines the LTZ, the bottom portion having a first thickness; and
a top portion that defines the HTZ, the top portion having a second thickness that is less than the first thickness of bottom portion.

15. The system of claim 14, wherein a volume per $mm^3$ of the phase change material within the bottom portion the PCM module sidewall is greater than a volume per $mm^3$ of the phase change material within the top portion of PCM module sidewall, such that bottom portion of the PCM module sidewall will absorb more thermal energy from the portion of the liquid disposed within LTZ of the beverage chamber than the top portion of PCM module sidewall will absorb from the portion of the liquid disposed within the HTZ of the beverage chamber.

16. The system of claim 11 further comprising a lid assembly that is removably engageable with at least one of the main body and the PCM module, the lid comprising a drinking hole that aligns with the egress flow path with the lid is engaged with the at least one of the main body and the PCM module.

17. A drinking container system, said system comprising:
a main body having a sidewall and a bottom that define a phase change material (PCM) module receptacle; and
a phase change material (PCM) module having a sidewall, the PCM module disposable within the PCM module receptacle such that a beverage chamber is defined within an interior space of the PCM module defined by the PCM module sidewall and between a distal end of the PCM module sidewall and the bottom of the main body, and such that a beverage egress flow path is defined by the PCM module and main body bottom and sidewall that extends from the interior space of the PCM module, between the distal end of the PCM module sidewall and the bottom of the main body and between the PCM module sidewall and the main body sidewall, wherein the PCM module sidewall is at least partially filled with a phase change material and comprises:
a bottom portion that defines a low temperature zone (LTZ) within the beverage chamber that is operable to maintain a temperature of a portion of a liquid disposed within the LTZ within a first temperature range, the bottom portion having a first thickness; and
a top portion that defines high temperature zone (HTZ) within the beverage chamber that is operable to maintain a temperature of a portion of the liquid disposed within the HTZ within a second temperature range that is higher than the first temperature range, the top portion having a second thickness that is less than the first thickness of bottom portion.

18. The system of claim 17, wherein the PCM module is removeably disposable within the PCM module receptacle.

19. The system of claim 17, wherein a volume per $mm^3$ of the phase change material within the bottom portion the PCM module sidewall is greater than a volume per $mm^3$ of the phase change material within the top portion of PCM module sidewall, such that bottom portion of the PCM module sidewall will absorb more thermal energy from the portion of the liquid disposed within LTZ of the beverage chamber than the top portion of PCM module sidewall will absorb from the portion of the liquid disposed within the HTZ of the beverage chamber.

20. The system of claim 17 further comprising a tea basket removably disposable within the HTZ.

* * * * *